US011604568B2

(12) United States Patent
Rydzewski et al.

(10) Patent No.: US 11,604,568 B2
(45) Date of Patent: *Mar. 14, 2023

(54) INTELLIGENT USER INTERFACE AND APPLICATION RENDERING

(71) Applicant: CERNER INNOVATION, INC., Kansas City, KS (US)

(72) Inventors: Francis G. Rydzewski, Kansas City, MO (US); Mike Hemesath, Olathe, KS (US); Denisse Osorio De Large, Overland Park, KS (US); Alex Beaumont, Overland Park, KS (US); Rick Steurer, Kansas City, MO (US)

(73) Assignee: Cerner Innovation, Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/321,666

(22) Filed: May 17, 2021

(65) Prior Publication Data

US 2021/0271362 A1 Sep. 2, 2021

Related U.S. Application Data

(63) Continuation of application No. 15/940,016, filed on Mar. 29, 2018, now Pat. No. 11,010,024.

(51) Int. Cl.
*G06F 3/0484* (2022.01)
*G06F 9/451* (2018.01)
*G06F 16/9535* (2019.01)

(52) U.S. Cl.
CPC ............ *G06F 3/0484* (2013.01); *G06F 9/451* (2018.02); *G06F 16/9535* (2019.01); *G06F 2203/04803* (2013.01)

(58) Field of Classification Search
CPC .... G06F 3/0484; G06F 9/451; G06F 16/9535; G06F 2203/04803; G06F 9/5005; G06F 8/38
See application file for complete search history.

(56) References Cited

U.S. PATENT DOCUMENTS

| | | | |
|---|---|---|---|
| 9,367,371 B2 | 6/2016 | Ni et al. | |
| 2002/0082144 A1 | 6/2002 | Pfeffer | |
| 2004/0054968 A1 | 3/2004 | Savage | |
| 2010/0275116 A1 | 10/2010 | Sun | |
| 2011/0107265 A1 | 5/2011 | Buchanan et al. | |
| 2014/0201038 A1 | 7/2014 | Minnis et al. | |
| 2015/0185030 A1 | 7/2015 | Monroe et al. | |
| 2015/0234984 A1 | 8/2015 | Singer et al. | |
| 2016/0012194 A1 | 1/2016 | Prakash et al. | |
| 2017/0061093 A1 | 3/2017 | Amarasingham et al. | |
| 2017/0140108 A1 | 5/2017 | Lee et al. | |
| 2017/0161439 A1 | 6/2017 | Raduchel et al. | |
| 2017/0262164 A1* | 9/2017 | Jain .......................... | G06F 9/451 |

(Continued)

*Primary Examiner* — Jennifer N Welch
*Assistant Examiner* — K C Chen
(74) *Attorney, Agent, or Firm* — Invoke

(57) ABSTRACT

A user request is received to access one or more resources. In response to the receiving and as a first background task, one or more remote data sources are queried for information associated with a user of the user request. The information from the one or more remote data sources are obtained. One or more portions of a user interface are caused to be generated based at least on the obtained information and as a second background task.

18 Claims, 11 Drawing Sheets

(56) References Cited

U.S. PATENT DOCUMENTS

| | | |
|---|---|---|
| 2018/0039757 A1 | 2/2018 | Sudharsan |
| 2018/0107794 A1 | 4/2018 | Fierer et al. |
| 2018/0144101 A1* | 5/2018 | Bitran .................... G16H 50/20 |
| 2018/0150609 A1 | 5/2018 | Kim et al. |
| 2018/0294048 A1 | 10/2018 | Blumenthal et al. |
| 2018/0325385 A1 | 11/2018 | Deterding et al. |
| 2018/0344215 A1 | 12/2018 | Ohnemus et al. |
| 2019/0006027 A1* | 1/2019 | Sacaleanu ........... G06F 16/2455 |
| 2019/0164651 A1 | 5/2019 | Shultz |
| 2019/0228847 A1 | 7/2019 | Soli |
| 2019/0302975 A1 | 10/2019 | Rydzewski et al. |

\* cited by examiner

FIG. 7.

INTELLIGENT USER INTERFACE AND APPLICATION RENDERING

CROSS-REFERENCE TO RELATED APPLICATIONS

This application is a continuation of U.S. application Ser. No. 15/940,016, entitled "Intelligent User Interface and Application Rendering" and filed Mar. 29, 2018 and which is now patented (U.S. Pat. No. 11,010,024), the entirety of which is incorporated by reference herein.

BACKGROUND

After launching a web browser, users typically either manually enter in a Uniform Resource Locator (URL) or provide search engine terms for each information need they have. Each individual set of information is typically provided via a single graphical user interface (GUI) or set of webpages. Users can also manually download or launch various applications for each need they have. Users often need to resolve multiple information-based matters simultaneously or within a certain time period, which results in repetitive browser queries, web page clicks, or application downloads.

In an illustrative example, if a user desires to see a doctor, the user may launch a web browser and query for different doctors in the area using a search engine. The user may then select a URL link that directs the user to a particular website to read about a particular doctor. If the user likes the doctor, the user may then have to input an insurance URL and login to an insurance website in to be reminded of a particular co-pay or obtain an ID number required for the doctor's visit. During the doctor's visit, the doctor may prescribe a certain medication to be picked up at a particular pharmacy. The user may once again provide a unique URL and/or launch a location tracking application to find out when the medication is ready, where the pharmacy is located, the hours of the pharmacy, etc.

BRIEF SUMMARY

Embodiments of the present disclosure generally include receiving a user request to access one or more resources. One or more remote data sources can be queried for information associated with a user of the user request as a first background task. The information can be obtained from the one or more remote data sources. A user interface schema can be caused to generate based at least on the obtained information and as a second background task.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 7 illustrates a screenshot of a graphical user interface that is generated based on obtaining and analyzing information from one or more remote data sources, according to embodiments;

DETAILED DESCRIPTION

Figure 1:
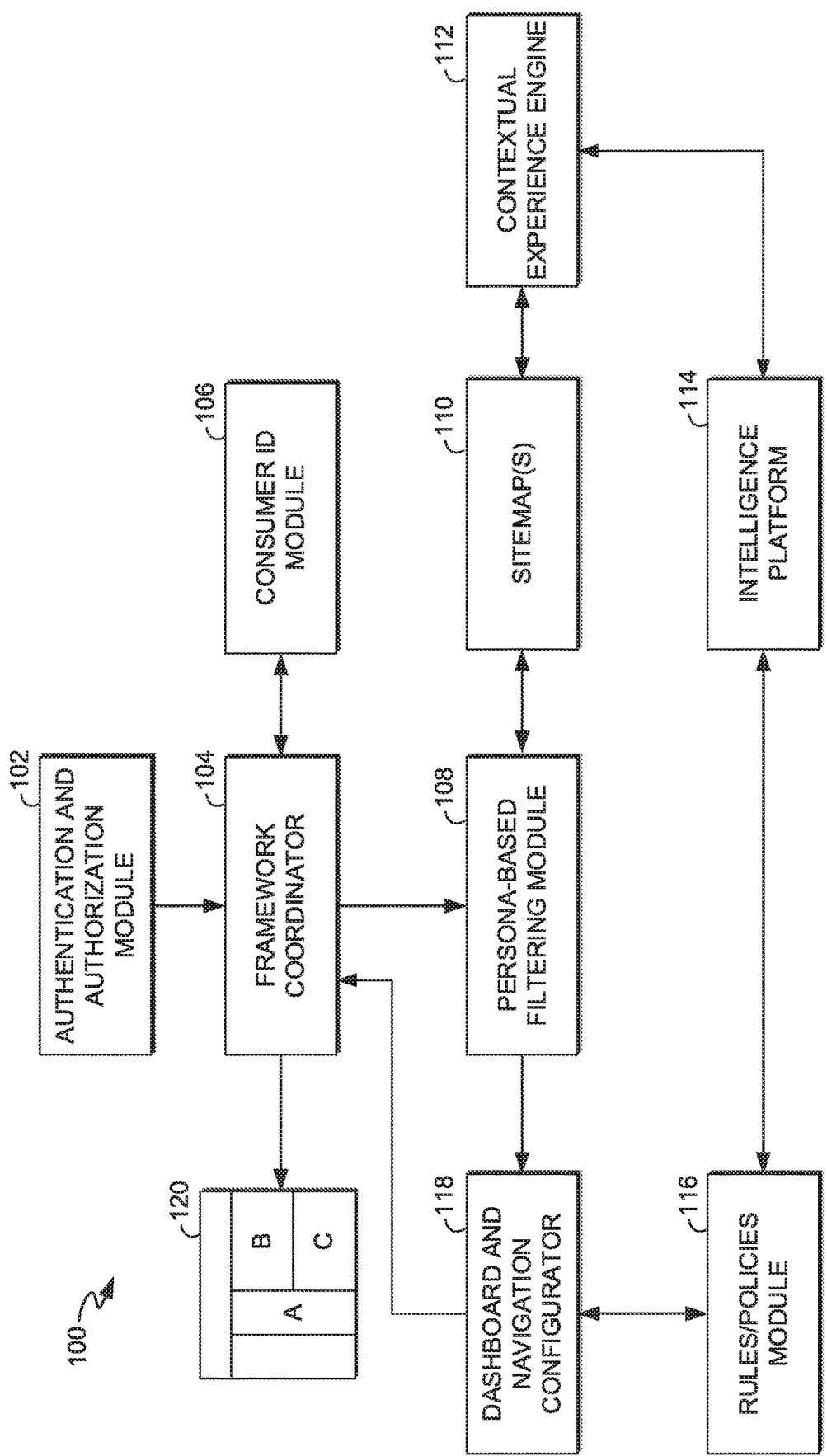
FIG. 1 is a block diagram of an illustrative system architecture in which embodiments of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

The existing user interface and application rendering technologies are based on static rules and information. This can cause network latency as well as user interface experience problems among others. For example, a client device, modem, and/or router can become saturated. In an illustrative example, a user may have opened various client applications (e.g., several browsers or windows on a browser) according to the example above of the user having to manually enter in several URLs. Accordingly, applications that the user launches may experience network contention, which means that they wait for each other's requests to be processed, causing lag associated with a router. Similarly, network contention can occur on a modem in response to various simultaneous downloads and online sessions, which may occur in the illustrative example above.

A user, such as a healthcare provider or patient, may also waste valuable time or be displeased with the lack of relevant information or schema of current user interfaces. For example, as illustrated above, the user may have to input several URLs, which when selected cause only a single graphical user interface (GUI) associated with the URL to appear. Accordingly, manually entering into each website and being presented with only one set of information may waste time. In another example, a healthcare provider may wish to provide and consolidate contextually relevant information for each patient they treat, such as tailored medication information, exercise information, nutrition information, or other wellness information associated with particular medical symptoms. Accordingly, the healthcare provider may have to provide several URLs so that the user has this information or the user may have to find this information themselves. This may cause various sets of important information to be missed.

Although existing technologies, such as IBM's WEB-SPHERE application servers allow users to tailor and consolidate web pages or applications according to their specific needs, the user configurations are static in that the user must input information in a non-real-time or non-runtime manner. At the coding level, what this means is that the business logic must already be hooked or linked to the appropriate interfaces (i.e., be executable) before a user logs on to a website or obtains a particular resource. However, the business logic may be outdated or need to be quickly updated dynamically for each individual that logs on.

Embodiments of the present disclosure are therefore employed to improve these existing user interface and application rendering technologies. Each of these shortcomings are improved by at least the following actions: receiving a user request to access one or more resources. One or more remote data sources can be queried for information associated with a user of the user request as a first background task. The information can be obtained from the one or more remote data sources. A user interface schema can be generated based at least on the obtained information and as a second background task. By implementing various tasks as "background tasks," the user need not manually login or generate URLs for each set of information they need. A "background task" as disclosed herein in embodiments includes one or more processes/threads/tasks that are performed in an automated manner without a specific user request for that task. Accordingly, there may not be as much network latency as described above. Moreover, by generating a user interface schema based on the obtained information, each user can for example have different but relevant contextual information from different remote data sources presented to him or her in one user interface at runtime, which is described in more detail below. Other benefits and improvements will become apparent as the present technology is further described below.

FIG. 1 is a block diagram of an illustrative system architecture 100 in which embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

It should be understood that the system 100 shown in FIG. 1 is an example of one suitable computing system architecture. Each of the components shown in FIG. 1 may be implemented via any type of computing device. The components may communicate with each other via programing interfaces or via a network that includes without limitation, one or more local area networks (LANs) and/or wide area networks (WANs). Such networking environments are commonplace in offices, enterprise-wide computer networks, intranets, and the Internet. It should be understood that any number of the components shown in FIG. 1 may be employed within the system 100 within the scope of the present invention. Each may be implemented via a single device or multiple devices cooperating in a distributed environment. Additionally, other components not shown may also be included within the environment.

Among other components not shown, the system 100 includes the authentication and authorization module 102, the framework coordinator 104, the consumer ID module 106, the dashboard and navigation configurator 118, the persona-based filtering module 108, one or more sitemaps 110, the contextual experience engine 112, the intelligence platform 114, the rules and policies module 116, and the GUI 120.

The authentication and authorization module 102 authenticates and authorizes users in order to trigger actions from the other components of the system 100. In some embodiments, the authentication and authorization module 102 is or includes an Identify Provider (IDP), which manages identity information. In an illustrative example, a user may open a web browser and enter into a website. The user may then be prompted to provide a username and passphrase in order to access additional features of the website.

In some embodiments, after the user is authenticated and authorized via the authentication and authorization module 102, an identifier corresponding to the user is passed to the framework coordinator 104. The framework coordinator 104 obtains various types of information about a user and responsively generates the GUI 120. The framework coordinator 104 queries the consumer ID module 106. The consumer ID module 106 takes the ID passed from the authentication and authorization module 102 and associates the ID with other identifiers of the user. Each of these identifiers together is known as a "persona." For example, the consumer ID module 106 can receive an IDP ID from the framework coordinator, match the IDP ID with an identical IDP ID found in a data structure (e.g., a hash table), and locate additional IDs within the same data structure, such as a consumer ID, a patient ID, and an insurance ID. The consumer ID module 106 may then pass the persona back to the framework coordinator 104.

The framework coordinator 104 passes the persona to the persona-based filtering module 108. The persona-base filtering module 108 filters sitemap layouts or content of the layouts based on both the persona and dynamic information received about the user. As illustrated, the persona-based filtering module 108 can first generate one or more sitemaps or user interface based on the persona. A "user interface schema" as disclosed herein is the spatial layout, orientation, content (e.g., specific characters, such as words, real numbers, letters, symbols, etc.), color, themes, and/or size of the user interface and/or particular instances (e.g., pagelets) of the user interface. A user interface need not be limited to GUIs but in some embodiments content is provided to the user via other means, such as through auditory methods (e.g., via a smart speaker).

In some embodiments, after the one or more sitemap(s) 110 are generated based on persona, the contextual experience engine 112 queries the intelligence platform 114. The contextual experience engine 112 obtains dynamic information about a user, such as near real-time data. The intelligence platform 114 queries, receives, and analyzes data from remote data sources to compute patterns, trends, and/or associations. The intelligence platform 114 in some embodiments is or includes a big data intelligence platform, such as HEALTHEINTENT by CERNER Corp. of Kansas City or HADOOP systems. For example, the intelligence platform 114 may query a social media website and determine that the user just had a fall and hurt herself. The intelligence platform is described in more detail below. In another example, the intelligence platform 114 may obtain information from one or more sensors, such as a pedometer to infer biometric and/or environmental attributes associated with a user.

The information gathered from the contextual experience engine 112 may be passed to the dashboard and navigation configurator 118. The dashboard and navigation configurator 118 consolidates the final views and/or content for the user interface schema. The dashboard and navigation configurator 118 queries the rules and policies module 116. The rules and policies module 116 stores different rules associated with a particular user or set of users. In some embodiments, the rules and policies module 116 queries the intelligence platform 114 for data sources not necessarily tailored to the user in order to learn or make policies. In some embodiments the rules or policies module 116 queries the intelligence platform 114 and receives contextual information from the contextual experience engine 112. The rules and policies module 116 may generate various conditional statements for a GUI schema layout based on this information. In an illustrative example, because the current weather is over 100 degrees Fahrenheit and because the user has expressed on social media that she is prone to heat strokes, the rules and policies module 116 can communicate with the dashboard and navigation configurator that heat stroke related information should take top priority in any user interface layout (e.g., a warning in larger print, a pagelet oriented at the top of the screen, etc.).

The dashboard and navigation configurator 118 takes the information from the rules and policies module 116 and the persona-based filtering module 108 back to the framework coordinator 104. The framework coordinator 104 then renders the user interface schema 120 based on the information received from the dashboard and navigation configurator 118.

Figure 2:
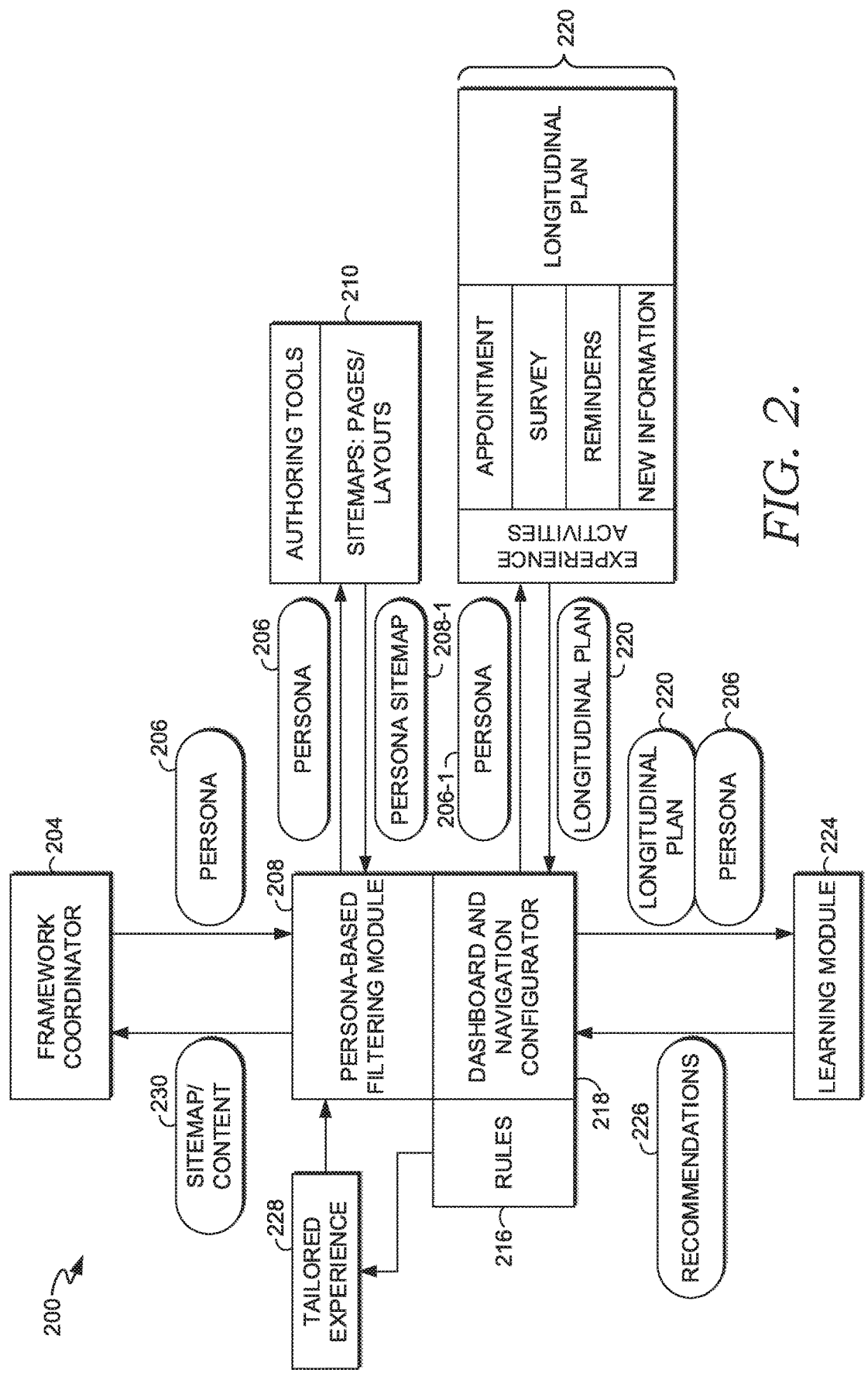
FIG. 2 is a block diagram of an illustrative system architecture in which embodiments of the present disclosure may be employed.

FIG. 2 is a block diagram of an illustrative system architecture 200 in which embodiments of the present disclosure may be employed. In some embodiments, the system 200 is a more detailed view of at least a portion of the system 100 of FIG. 1. Accordingly, components with the same narrative identifiers (e.g., framework coordinator) in both figures may represent the same components. In some embodiments, the system 200 illustrates a different architecture than that of FIG. 1.

The framework coordinator 204 passes consumer information to the rest of the components and responsively generates a dynamic user interface. The system 200 illustrates that the framework coordinator 204 passes the persona data 206 to the persona-based filtering module 208. The persona-based filtering module 208 then utilizes the authoring tools 210 to generate sitemaps, pages, layouts, catalogues, libraries, and/or user interface schema based on the persona 206.

The dashboard and navigation configurator 218 uses the persona 206 to generate the longitudinal plan 220. The longitudinal plan 220 is a set of data that indicates assignments, reminders, goals, and/or any other relevant information tailored for a particular user. In some embodiments, the longitudinal plan 220 is generated via obtaining information received by the intelligence platform 114 of FIG. 1. In an illustrative example of what the longitudinal plan 220 is in the health context, the longitudinal plan 220 can include health appointment times/places, surveys that need to be filled out, reminders (e.g., take medication X today), and/or any other information. The longitudinal plan 220 need not be limited to healthcare contexts, but can include banking, employer, real estate and/or other data associated with a user.

For a more dynamic experience, the dashboard and navigation configurator 218 passes the longitudinal plan 220 to the learning module 224. In some embodiments, the learning module 224 is located within the intelligence platform 114 and/or contextual experience engine 112 of FIG. 1. The learning module 224 identifies patterns associated with information obtained from the longitudinal plan 220, generates one or more prediction estimates, and makes the recommendations 226 for a user interface schema. In some embodiments, the learning module 224 further refines or modifies the longitudinal plan 220 by learning about a user and making responsive recommendations 226, which is described in more detail below. The recommendations 226 are then sent to the dashboard and navigation configurator 218 and compared against a set of rules 216 (e.g., generated by the rules and policies module 116). Accordingly, the tailored experience 228 (i.e., the plans for a particular user interface schema) is then transmitted back to the persona-based filtering module 208. The particular sitemap and/or content (e.g., user interface schema) plans 230 are sent back to the framework coordinator 204. The framework coordinator 205 then generates the user interface schema on the sitemap and/or content received from the persona-based filtering engine 208.

Figure 3:
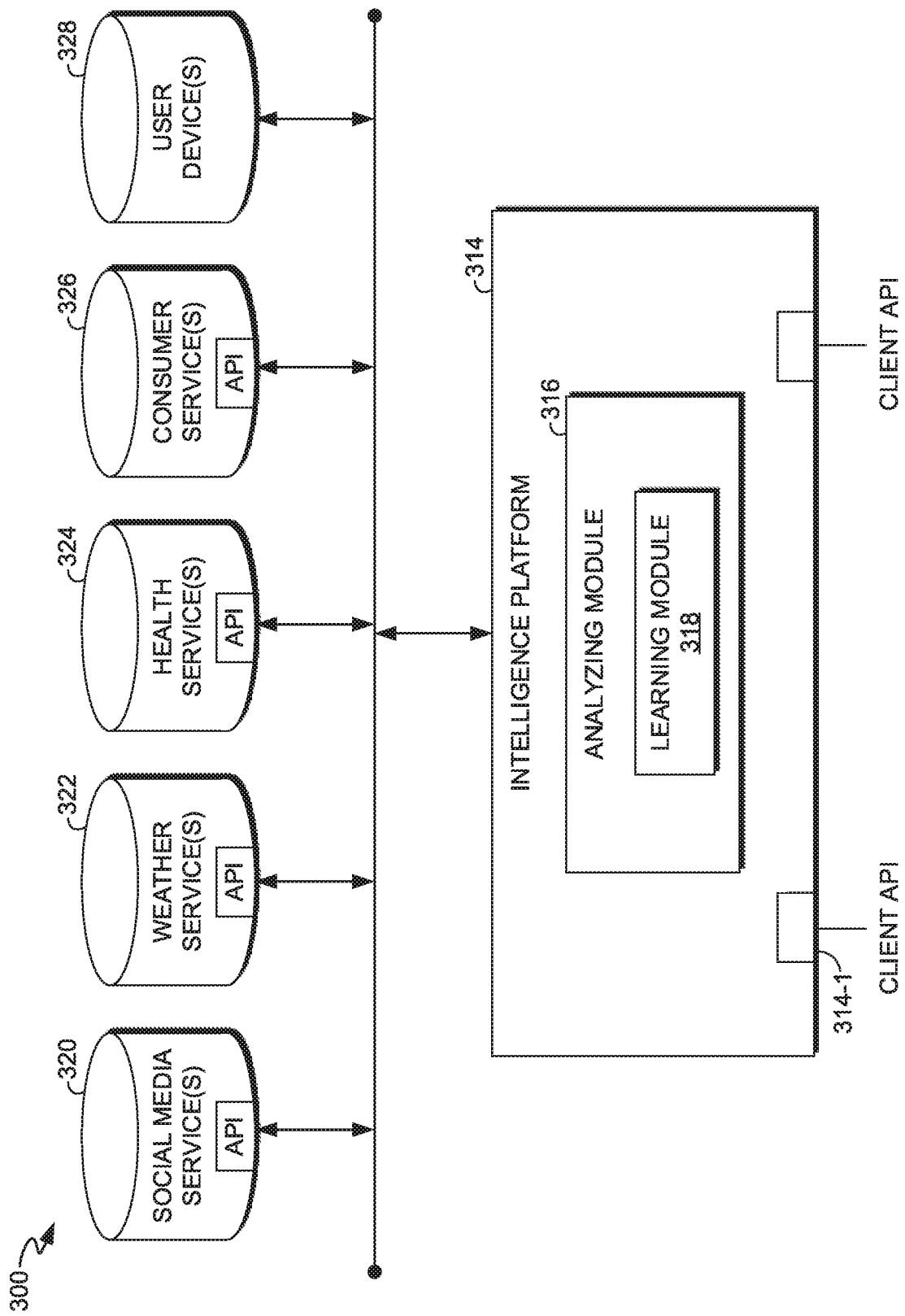
FIG. 3 is a block diagram of an illustrative system architecture in which embodiments of the present disclosure may be employed.

FIG. 3 is a block diagram of an illustrative system architecture 300 in which embodiments of the present disclosure may be employed. In some embodiments, the intelligence platform 314 is a more detailed view of the intelligence platform 114 of FIG. 1. The intelligence platform 314 can host one or more client Application Program Interfaces (APIs) (e.g., client API 314-1) that are configured to hook to the business logic of third party vendors. The intelligence platform 314 is also configured to communicate (e.g., via one or more wireless networks) with various remote data sources. In FIG. 3, such remote data sources are represented by the social media service(s) 320, the weather service(s) 322, the health service(s) 324, the consumer service(s) 326, and the user device(s) 328. Each service corresponds to one or more physical servers, devices, and/or data stores that contain the information needed. It is understood that the remote data sources are representative only and that more or fewer remote data sources or types of data sources may be present in the system 300. For example, remote data sources can instead or in addition be music services, restaurant services, and/or any other service where user information can be obtained.

The client APIs (e.g., 314-1) within the intelligence platform 314 are configured to link or interface with third parties' business logic, which contains the logic specifying the information or data sources needed for querying. For example, the business logic may correspond to a mobile app needing real-time weather data and social media information about a user that has logged in. Accordingly, the intelligence platform 314 in this instance queries the weather service(s) 322 and the social media service(s) 320 to obtain and analyze the information needed for the application. In another example, the business logic may correspond to or include a database manager configured to execute queries against a third party database. The intelligence platform 314 may provide APIs that can be consumed by 3rd party applications, thereby enhancing them. For example, a future version of APPLE HEALTH could consume the intelligence platform's APIs to enhance its interface. In some embodiments, the intelligence platform 314 can provide client potentially cross-client interfaces. Accordingly, the intelligence platform 314 can be implemented for use with multiple platforms, such as multiple operating systems due to, for example, running multiple virtual machines with unique operating systems within one or more hosts.

Each API of the remote data sources are interfaces configured to communicate and transmit data to the intelligence platform 314. For example, the social media service(s) 320's API can be configured to match each received identifier corresponding to user identity to an identical user identifier stored in a data structure of the social media service(s) 320 so that that user's account information can be obtained and transmitted back to the intelligence platform 314.

The intelligence platform 314 in embodiments is configured to ingest all of the data from some or each of the remote data sources and utilize Natural Language Processing (NLP), machine learning, data mining, and/or other techniques (e.g., via the learning module 224) to identify patterns and associations and take responsive actions in order to generate a dynamic user interface schema. The data within the data sources may thus be structured (e.g., be contained in databases), semi-structured, and/or unstructured (e.g., social media feeds, digital files, etc.).

NLP is a technique configured to analyze semantic and syntactic content of the unstructured data of the set of data. In certain embodiments, the natural language processing technique may be a software tool, widget, or other program configured to determine meaning behind the unstructured data. More particularly, the natural language processing technique can be configured to parse a semantic feature and a syntactic feature of the unstructured data. The natural language processing technique can be configured to recognize keywords, contextual information, and metadata tags associated with one or more portions of the set of data. In certain embodiments, the natural language processing technique can be configured to analyze summary information, keywords, figure captions, or text descriptions included in the set of data, and use syntactic and semantic elements present in this information to identify information used for dynamic user interfaces. The syntactic and semantic elements can include information such as word frequency, word meanings, text font, italics, hyperlinks, proper names, noun phrases, parts-of-speech, or the context of surrounding words. Other syntactic and semantic elements are also possible. Based on the analyzed metadata, contextual information, syntactic and semantic elements, and other data, the natural language processing technique can be configured to make recommendations (e.g., the recommendations 226).

As an example, the natural language processing technique may identify words associated with one or more emotions (e.g., the word "glad" may be associated with "happiness," the word "uncertain" may be associated with "confused," or vice versa), analyze the semantic and syntactic usage and context of the words, and determine one or more sentiment features. For instance, in certain embodiments, the natural language processing may parse unstructured data of the set of data in the form of a user comment stating "My walk in the park this morning was delightful!" and identify the word "delightful" as being associated with the emotion of "happiness." Accordingly, in certain embodiments, a sentiment feature of "happiness" can be extracted and used for user interface recommendations. Further, the sentiment feature of "happiness" may be associated with a setting/location of "the park this morning." Additionally, in certain embodiments, the natural language processing technique may determine the sentiment feature by analyzing marks or symbols associated with the set of data (e.g., emoji, ideograms, pictographs, emoticons, and the like). Each set of this information can then be used to tailor a user interface schema.

In an example illustration of how the system 300 can work, the intelligence platform 314 may first query the social media service(s) 320 to retrieve a history of user posts. The intelligence platform 314 may also query the weather service(s) 322 to retrieve weather data for a particular location that the user is in. The intelligence platform 314 may query one or more health services 324, such as pharmacies, health care providers, health insurance providers, personal trainers, etc. to obtain various sets of data pertaining to the particular user's health history within those respective domains. For example, the intelligence platform may receive patient records from a physician specialist server, medication history purchases of a particular user, and a history of gym attendance of a particular user.

The intelligence platform 314 may also obtain financial data from the consumer service(s) 326. For example, financial data may include bank account histories and information, retail purchase histories, real estate purchase history, car dealer purchase history, etc. The intelligence platform 314 can also query and obtain information from one or more user devices 328 associated with a user. Such devices may be queried for different reasons. For example the intelligence platform 314 can query a location tracking application that gives geographical coordinates of the device (e.g., via a GPS system or location beacon). Obtaining such coordinates may allow an inference to be made that a user is located in a particular region assuming that he or she is carrying the user device. And depending on the coordinates, the user may receive a geographically relevant user interface schema. For example, if the coordinates are associated with rough terrain and a user has a bad back, a reminder may be transmitted to a main portal reminding the user to bring pain medication. One or more user devices 328 can also be queried in order to scrape data from the device itself, such as text messages and symbols (e.g., emoticons). This information may offer insight into the health or well-being of the individual in order to generate the user interface schema. In some embodiments, bots such as web crawlers or scrapers can scrape data off of any open web browser window located on the user device(s) 328. In some embodiments, bots may be utilized on other remote data sources instead of or in addition to the one or more user device(s) 328.

In some embodiments, the one or more user device(s) 328 represent or include sensors, which include transmitters and/or receivers. Examples include one or more of a: temperature sensor, biometric sensor (e.g., pulse oximeter, skin conductance sensor, etc.), accelerometer, gyroscope, camera, light sensor, etc.

Each of the information retrieved by the intelligence platform 314 may then be analyzed and used to present a dynamic user interface schema. In some embodiments, the analyzing module 316 first utilizes ingestion techniques, such as NLP to parse various unstructured information passages and categorize structured data. The analyzing module 316 may then generate particular patterns and/or classifications using one or more models or suitable techniques, such as neural networks (e.g., Word2vec), linear regression models, Bayesian models, etc. For example, using machine learning linear regression models, various data points can be made on a scatter plot. Each data point may correspond to some or each of the histories described above, such as social media posts.

The learning module 318 may include a training mechanism that is able to learn patterns after various data inputs. For example, after multiple training sessions, the appropriate slope on the scatter plot may be finalized and one or more high probability predictions can be made based on historical information. In an example illustration, each data point on a scatter plot can correspond to each social media post and the model may identify whether a user has pain on a particular day of the week. The plot may reveal that the user has pain the most on Fridays, which happens to be the user's longest work days. Accordingly, the learning module 316 can predict on the next Thursday, that the user will have pain the next day on Friday. The learning module 316 may responsively provide recommendations (e.g., to the framework coordinator 204) in order to present relevant data in a user interface schema, such as reminders to bring pain medication to work the next day on Friday.

Figure 4:
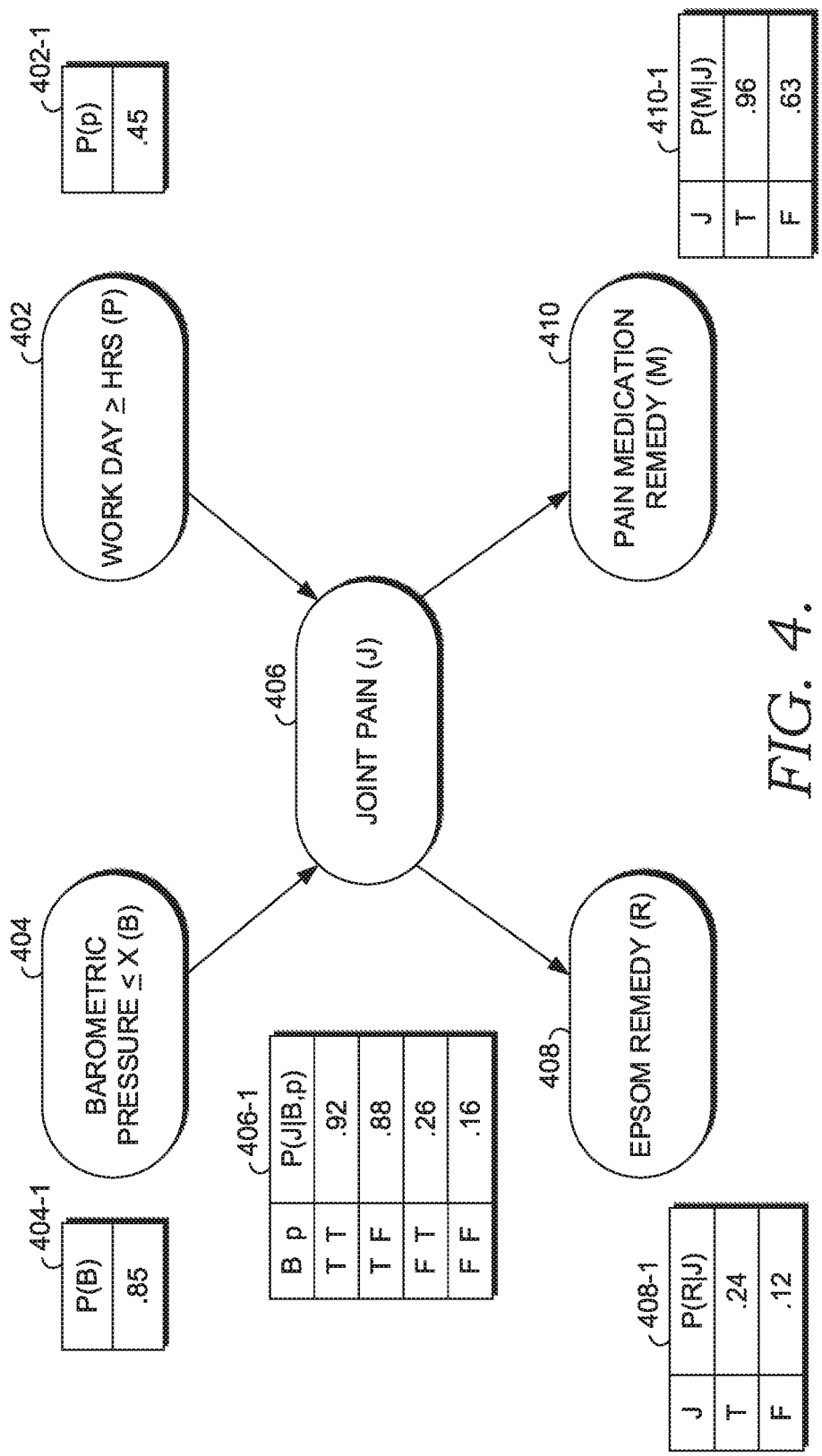
FIG. 4 is a schematic diagram of a directed acyclic graph, representing how learning can occur according to some embodiments.

FIG. 4 is a schematic diagram of a directed acyclic graph, representing how learning can occur according to some embodiments. In embodiments, the acyclic graph corresponds to algorithms that are employed by the learning module 224 of FIG. 2 and/or the analyzing module 316 of FIG. 3. It is understood that although the learning is illustrated by the directed acyclic graph in these embodiments, other models can be used instead of or in addition to the directed acyclic graph. For example, learning can occur via one or more of: neural networks, undirected graphs, linear regression models, logistic regression models, support vector machines, etc. It is also understood that the directed acyclic graph of FIG. 4 can include more or less nodes with additional or different descriptors.

In some embodiments, the directed acyclic graph of FIG. 4 represents a Bayesian network graph. A Bayesian network graph maps the relationships between nodes (i.e., events) in terms of probability. These graphs show how the occurrence of particular events influence the probability of other events occurring. Each node is also conditionally independent of its non-descendants. These graphs follow the underlying principle of Bayes' theorem, represented as:

$$P(A \mid B) = \frac{P(B \mid A)P(A)}{P(B)}, \quad \text{Equation 1}$$

where A and B are events and P(B)≠0. That is, the probability (P) of A given B=the probability of B given A multiplied by the probability of (A) all over the probability of B.

The directed acyclic graph includes various nodes, directed edges, and conditional probability tables. The node 404 and its conditional probability table 404-1 illustrate that there is an 85% chance given the current circumstances, that the barometric pressure (B) is or will drop below or equal to a threshold X. This probability can be obtained, for example, by obtaining geolocation information of a user and historical data. For example, the geolocation can reveal that the user is in a high elevation area, such as the mountains. And given that high elevation is associated with drops in barometric pressure, there is a higher chance of that the barometric pressure (B) will be below or equal to a threshold X.

The node 402 and its conditional probability table 402-1 indicate that there is only a 45% probability that a user will have a work day less than or equal to X hours (P). This probability or any other probability described herein can be obtained, for example, by scraping historical calendaring information off of a user device, social media feeds that specify the worker's working duration, any historical information found within the remote data sources of FIG. 3, manual registration of information, etc.

The node 406 joint pain (J) and its conditional probability table 406-1 show the probability of joint pain (J) given the variables (B) and/or (P) being true (occurring) or false (not occurring). The conditional probability table 406-1 illustrates that if (B) and (P) are both true, there is a 92% chance of joint pain (J) occurring. If (B) is true and (P) is false, there is an 88% chance of (J) occurring. If (B) is false, and (P) is true, there is only a 26% chance of (J) occurring. If (B) and (P) are both false, there is only a 16% chance of (J) occurring.

The node 408 epsom remedy (R) and its conditional probability table 408-1 illustrate the probability that the user will engage in the epsom remedy (R) given that the user has or has not experienced the joint pain (J). The conditional probability table 408-1 illustrates that if (J) is true, the user has a 24% probability of using an epsom remedy. Further, if (J) is false, the user only has a 12% probability of using an epsom remedy.

The node 410 medication remedy (M) and its conditional probability table 410-1 illustrate the probability that the user will engage in the medication remedy (M) given that the user has or has not experienced the joint pain (J). The conditional probability table 410-1 illustrates that the probability of (M) occurring given that (J) is true is 96%. And the probability of (M) occurring given that (J) is not true is only 63%.

Each of these calculations can be used to provide recommendations (e.g., the recommendations 226) so that an intelligent user interface schema and/or one or more applications can be rendered. For example, according to the directed acyclic graph, there is a very high likelihood (85%) that the barometric pressure (B) will be below a threshold. And based on this, we also know that regardless of how many hours (P) that a user will work, he or she is likely to experience joint pain (J) (88%-92% chance). And because of that high probability the user will more likely take the medication remedy (M) instead of the epsom remedy (R). Accordingly, a tailored application and/or user interface can be generated or modified to reflect this. For example, as soon as the system has geolocation information that indicates that the user is in a high elevation (indicating a lower barometric pressure will occur), the system (e.g., the intelligence platform 114) can obtain a web page or other application from a remote data source showing the closest drug store to the user that sells pain medication. It can then be transmitted and displayed to the user, such as in a large GUI window placed at the top of several pagelets.

Figure 5:
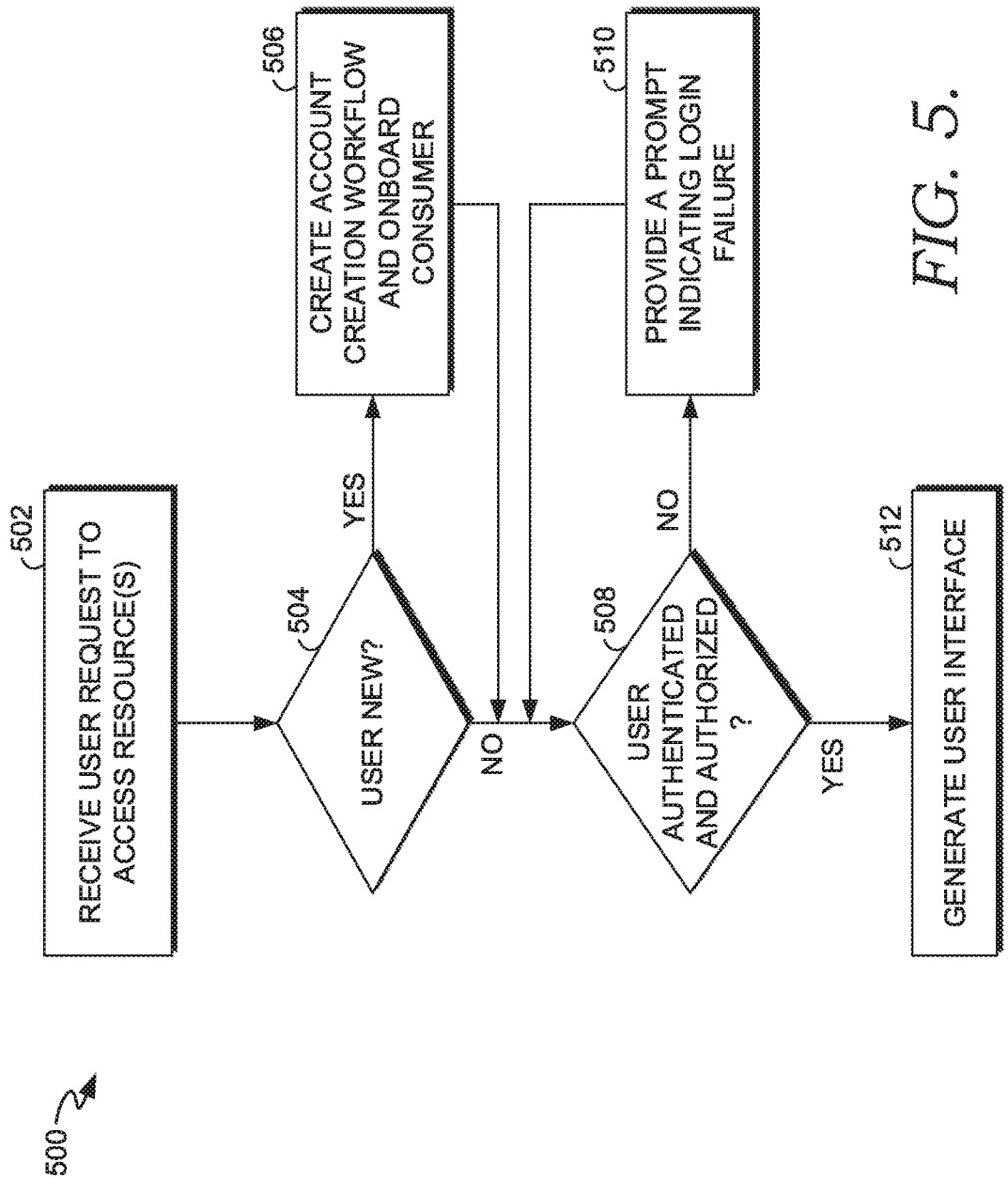
FIG. 5 is a flow diagram of an illustrative process for onboarding a consumer and generating a user interface, according to embodiments.

FIG. 5 is a flow diagram of an illustrative process 500 for onboarding a consumer and generating a user interface, according to embodiments. The process 500 or any other process described herein (e.g., process 600 of FIG. 6) can be performed by processing logic that comprises hardware (e.g., circuitry, dedicated logic, programmable logic, microcode, etc.), software (e.g., instructions run on a processor to perform hardware simulation), firmware, or a combination thereof.

Per block 502, a user request to access one or more resources is received (e.g., by the authentication and authorization module 102). For example, a user device may request to open a web portal via entering in a unique URL. A "resource" as described herein can be a website, web page, one or more GUI features, applications, instances of an application, and/or any other set of data that is requested.

Per block 504, it is determined (e.g., via the module 102) whether the user is a new user who seeks to create a new account. If the user has made a selection to create an account, per block 506, an account workflow is created and the consumer (i.e., a user) is onboarded. Account creation workflow can include data and processes such as the user creating a username and/or passphrase, creating security questions and/or answers, and generating (or receiving) an initial ID for the user (e.g., IDP ID). The account creation worklow can also include constructing a Security Assertion Markup Language (SAML) for exchanging authentication and authorization information (e.g., with the framework coordinator 104 of FIG. 1), administrative controls, recovery workflows (e.g., SMS TOTP recovery mechanisms), email account information, etc.

In some embodiments, onboarding includes the user or client application specifying which services or remote data sources will be queried for application rendering and/or user interface generation. For example referring back to FIG. 3, a given application may be only concerned with health data about a patient and therefore one or more addresses (e.g., IP address(s), port number(s), etc.) associated with the one or more health services 324 may be provided as part of onboarding so that the intelligence platform 314 knows what services to contact. For example, in this illustration, the intelligence platform 314 may only communicate with the health service(s) 324 and not any of the other remote data sources.

Per block 508, it is determined (e.g., via the authentication and authorization module 102) whether the user is authenticated and authorized to access the one or more resources. For example, the user may input his or her username and password and it can be determined if it is correct. Per block 510, if the user is not authenticated and authorized, a prompt is provided indicating a login failure. Such login failure can indicate that the user input the incorrect credentials or is not authorized for particular resources despite the correct input of credentials.

Per block 512, if the user is authorized and authenticated, a user interface is generated (e.g., by the framework coordinator 104). For example, a dashboard can be created. A "dashboard" is a user interface that organizes and presents information in a particular way (e.g., particular themes, colors, quantity of pagelets, content, etc.). In some embodiments, in block 512 other applications or user interfaces are generated instead of or in addition to a dashboard, such as mobile OS root screen. The generation of the user interface is described in more detail below.

Figure 6:
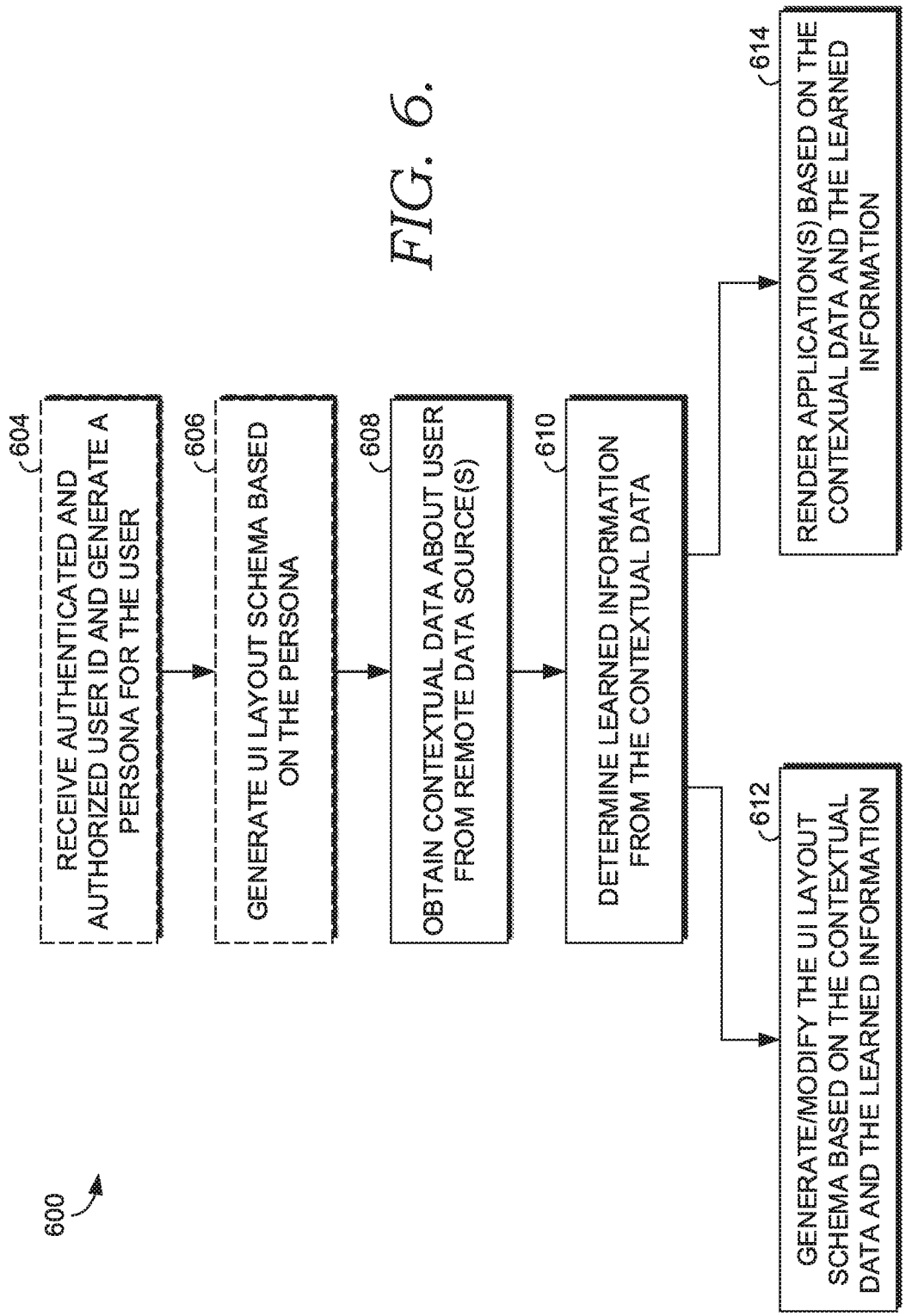
FIG. 6 is a flow diagram of an illustrative process for how a user interface or application can be rendered, according to embodiments.

FIG. 6 is a flow diagram of an illustrative process 600 for how a user interface or application can be rendered, according to embodiments. The dotted blocks in the process 600 indicate that such blocks are optional, although it is generally understood that any block can be optional depending on the embodiments being utilized. According to these embodiments, blocks 604 and 606 are optional. Per block 604, an authenticated and authorized user ID is received and a persona is generated for the user (e.g., by the framework coordinator 104). For example, the persona can include various IDs associated with the user, such as whether the user is a patient, staff, insurance ID, IDP ID, etc.

Per block 606, a UI schema is generated based on the persona (e.g., by the framework coordinator 104 of FIG. 1). For example, the initial user interface can be built using static information, such as information the user input at the onboarding stage (e.g., the information at block 506 of FIG. 5). In an example illustration, such static user interface may include a view of the user's email inbox or a view of information relating to the user's inputted health information (e.g., symptoms, diseases, etc.).

Per block 608, contextual data about the user is obtained from one or more remote data sources. For example, referring back to FIG. 3, after the user requests one or more resources, the intelligence platform 314 can query, as a background task, one or more remote sources for information associated with the user, such as the one or more consumer services 326. After, the intelligence platform 314 communicates with the service's API, the service(s) may then retrieve the information corresponding to the provided user ID and transmit such information over a wireless network back to the intelligence platform 314.

Per block 610, learned information from the contextual data can be determined (e.g., by the learning module 318). "Contextual data" is any data particular to a user, such particular social media posts, health service account information, consumer service information histories, etc. One or more patterns associated with the obtained information can be identified. One or more prediction estimates associated with the user can be generated based on the one or more patterns. For example, "patterns" in some embodiments includes identifying recurring events or the absence of recurring events via parsing various historical information. Using an illustrative example, the system can identify a pattern that the user predominantly works more than 10 hours on Monday and 7 or less hours any other days of the week given a 2 year history of the user's schedule. A "prediction estimate" in embodiments includes making a prediction or probability calculation that one or more events are likely to occur or not occur given the patterns identified. For example, using the illustration above, system can predict that a user has a 90% chance of working ten or more hours in the upcoming Monday, given the working history patterns of the user. In some embodiments, prediction estimates are or include some or each of the probability estimates of FIG. 4.

The learned information need not be limited to contextual data or data associated with a particular user. For example, learning can occur against remote data sources unrelated to specific user service accounts. In an illustrative example, data from various weather services can be gathered in order to determine a mean or median temperature for the month of February or the likelihood of travel issues. This can be used to render applications and/or provide the appropriate user interfaces, such as a reminder to drive slowly if the majority of weather services are recommending slow travel.

Per block 612, the UI schema can be modified or generated based on the contextual data and learned information about the contextual data. For example, a system, such as the framework coordinator 104 can cause a user interface schema at a user computing device to be generated. This can be based at least on the obtained information (e.g., contextual information). This can also be based on one or more prediction estimates as described above. A user interface or application rendering action can continue to be modified based on new information received from one or more remote sources. For example, at a first time, a GUI may include a first orientation with first information. Because the system can include real-time updates, at a second time, which may be close to the first time, a health status may have changed. For example, the system may detect that the user has suddenly fallen, is losing blood oxygen, and it moving below a threshold (e.g., via an accelerometer and pulse oximeter). The GUI can change to a second information in a second orientation to offer suggestions to cope with a fall. For example, a health-related pagelet can change its orientation from the bottom of the screen to the top of the screen and the new second information provided.

In some embodiments, this modification is automated and happens at runtime such that the user device has already initiated a session with the system and the UI is changed in the background without any user involvement. Accordingly, the user may view the GUI in a first state, and it may suddenly change to a second state during a session based on real-time data received without the user realizing it. This is different than typical applications that are rendered and presented based on static information the user has provided shortly after a session starts, such as when the user registers for a service. If there needs to be an update, the user then typically updates the information manually.

Figure 7:
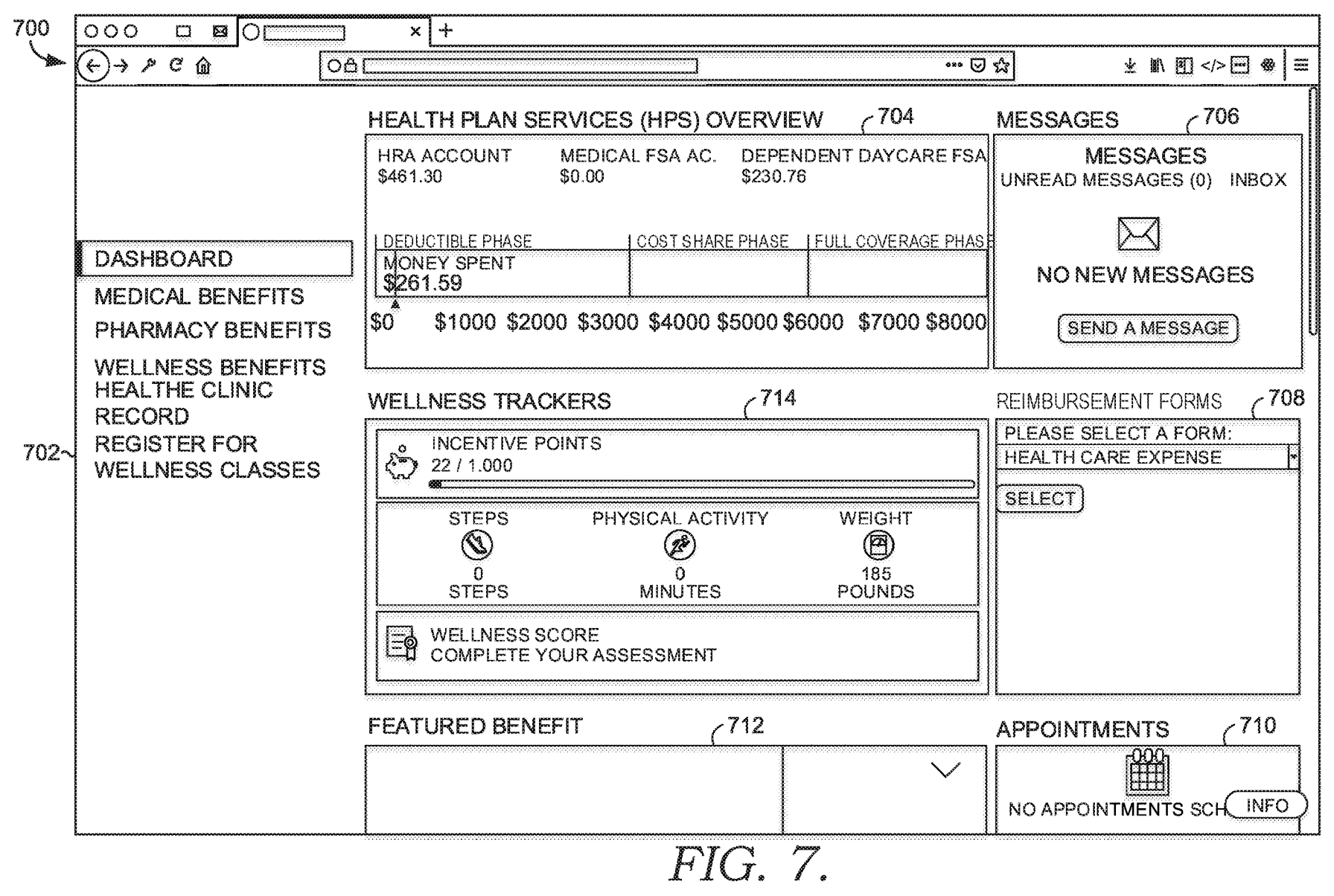

FIG. 7 illustrates a screenshot of a graphical user interface 700 that is generated based on obtaining and analyzing information from one or more remote data sources, according to embodiments. It is understood that although the GUI 700 depicts a specific schema, the specific schema can instead or in addition include one or more different features, such as only one set of content, more or less applications, etc.

As shown in FIG. 700, the GUI 700 includes a menu component 702 and a plurality of pagelets—704, 706, 708, 712, and 714. A "pagelet" as described herein is an application (or instance of an application) that is embedded within a containing application or larger application set, such as a web page (e.g., a "composite page") or portal. A "portal" is a web application that typically provides single sign on or login for users such that only portal members can see or be provided the content within the portal, content aggregation from different sources, and portals host the presentation layer of information.

Each pagelet or views of a pagelet is configured to be displayed in a GUI. Pagelets and the "containing application" is typically stored to different hosts, although this is not always the case. For example, a web page is typically stored to a web server, whereas a pagelet can be stored on an application server. At the coding level, a pagelet can represent an object-oriented class that is managed by a particular container. In some embodiments, each pagelet includes one or more windows such that the pagelet can be exited, minimized, or enlarged. In some embodiments, individual pagelet is not directly addressable via a URL, but only the website or page that hosts the pagelet is addressable. In yet other embodiments, pagelets can be portlets or servlets. In some embodiments, pagelets can be or include external web applications and/or web pages, which are not built or generated to be embedded in the containing application, but can be dynamically included in the UI schema based on persona and/or other user contextual information. For example, referring back to FIG. 3, in some embodiments a pagelet is or includes a web page view as it appears when one or more of the remote data sources (e.g., weather service(s) 322) have been queried and displayed to any device. A "view" as described herein is the graphical user interface layout, including characters and images. Accordingly, a plurality of web page/application views from various websites can be presented in the containing application in a single view.

The GUI 700 illustrates a health service plan pagelet 704. This pagelet 704, or any other pagelet described herein, can be a view and/or include content of a particular website or application associated with one or more remote data sources.

For example referring back to FIG. 3, the one or more health services 324 can include a health insurance provider that locates and transmits health insurance information and/or web views to the intelligence platform 314, which then causes the display of the pagelet 704.

Likewise, the pagelet 706 can include a view or information associated with a user's personal or business email account (e.g., one of the consumer services 326 of FIG. 3). The pagelet 714 can include a view or information associated with one or more of the health services 324 or sensors (e.g., the one or more user devices 328). For example, a user can be wearing an activity tracker (e.g., a tracker by a FITBIT Inc. of San Francisco) that tracks the quantity of steps the user takes, distance traveled, calories burned, movement detections, heart rate, steps climbed, quality of sleep, etc. This information can be sampled from the user and then transmitted over a wireless network back to the intelligence platform 314 and rendered as the pagelet 714.

The GUI 700 illustrates that each pagelet can be dynamically rendered, such as in real time or run time. For example, as soon as a user logs into a website and/or selects the "Dashboard" feature of the menu component 702, one or more remote data sources (e.g., the remote data sources of FIG. 3) can be queried as a background task to retrieve various sets of information particular to the user who logged on. The user is then provided, as a background task, with the dashboard (e.g., the GUI 700). As is apparent in the GUI 700, each of a plurality of users who log into a website and/or select the "Dashboard" feature of the menu component 702 can show different, tailored, and contextual data specific to the user who requested the one or more resources. For example, a first user who logs on to the website may see a first set of insurance and health information as displayed in the pagelets 704 and 714. A second user can then log in to the same website and have session crossover (i.e., one or more portions of each of the users' sessions are occurring at the same time or are in parallel) but still be rendered an entirely different GUI that includes a second set of insurance information and health information that includes different content and different pagelet orientation.

In some embodiments, a particular user's user interface can be modified or updated in real-time or at particular intervals (e.g., every 1 minute). These modifications in some embodiments are based on one or more prediction estimates (e.g., predictions associated with the Bayesian network of FIG. 4). For example, the GUI 700 may exist at a first time with all of the associated content. However, at a second time, the wellness tracker pagelet 704 may suddenly indicate at the second time that the user is experiencing and increase in core body temperature. Accordingly, at the second time the pagelet 714 may change its orientation and size to the top of the GUI 700 to replace the field previously used by the pagelet 704. The content can be changed to bold and accompanied with other notification mechanisms, such as an auditory alarm. Each of these actions indicate the priority, relevance, and ranking of the new information gathered.

Figure 8:
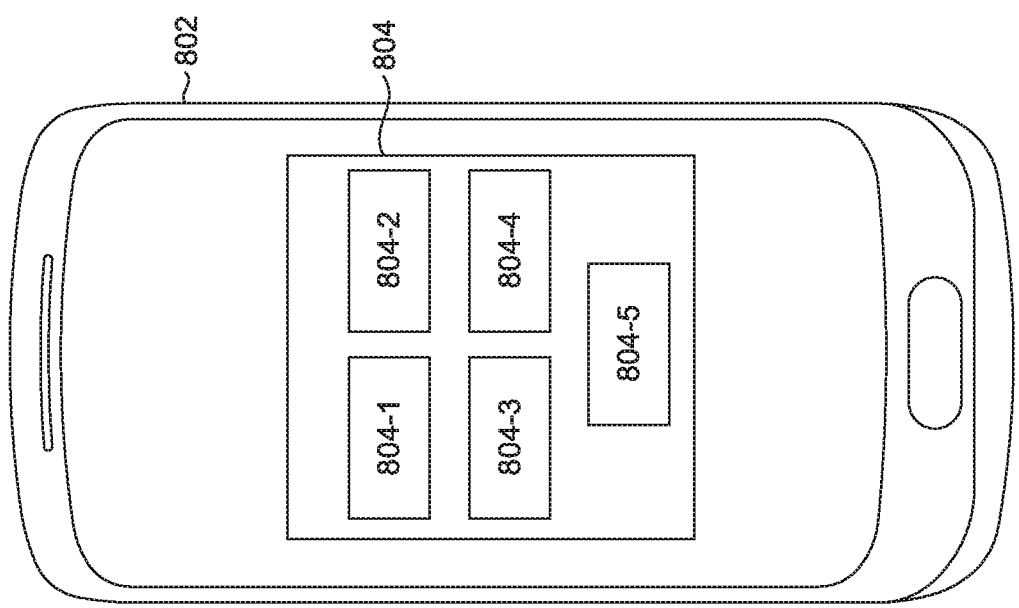
FIG. 8 is a schematic diagram of a mobile device user interface that includes various applications being rendered based on obtaining and analyzing information from one or more remote data sources, according to embodiments.

FIG. 8 is a schematic diagram of a mobile device user interface that includes various applications being rendered based on obtaining and analyzing information from one or more remote data sources, according to embodiments. The mobile device 802 includes the overall application or user interface layout 804. In some embodiments, 804 represents a directory or folder that includes each of the applications 804-1, 804-2, 804-3, 804-4, and 805-5. Embedded within the application 804 includes individual applications or sub-applications 804-1, 804-2, 804-3, 804-4, and 805-5.

In embodiments, some or each sub-application corresponds to different service views or content. For example referring back to FIG. 3, the one or more social media services 320 may render one or more views and/or content as corresponding to the application 804-1. The one or more weather services 322 can render one or more views and/or content corresponding the application 804-2. The one or more health services 324 may render one or more views and/or content corresponding to the application 804-3. The one or more consumer services 326 may render one or more views and/or content corresponding to the application 804-4. The one or more user devices 328 can render one or more views and/or content corresponding to the application 804-5. In some embodiments, "rendering" is or includes or more steps of: querying one or more remote data sources, obtaining information associated with the data source, transmitting the data back to the system that queried (e.g., the intelligence platform 314 of FIG. 3), and causing the user interface to be generated or applications to be provided or displayed.

In an illustrative example of how such applications can be rendered, a user carrying a mobile device (e.g., a Smartphone), may enter a hospital building via a door. The walls and/or ceilings of the hospital building can include one or more beacon transmitters. Beacon transmitters, such as a BLUETOOTH LOW ENERGY (BLE) devices transmit one or more location identifiers to any listening device, which then queries and obtains information from one or more servers relevant to the location. Such information is usually displayed to a device. For example, in some embodiments a beacon transmitter transmits an identifier to the mobile application 804. The mobile application 804 then contacts, as a background task, the intelligence platform 314 through a client API, giving the platform the location identifier. The intelligence platform 314 then use this information to contact, as a background task, one or more of the remote data sources (e.g., the one or more health services 324). The one or more remote data sources then transmits this information back to the intelligence platform 314. The system (e.g., the framework coordinator 104) can then responsively transmit the applications 804-1, 804-2, 804-3, 804-4, and 804-5 to the mobile device 802 and more specifically as an embedding within the application or directory 804. In some embodiments, the applications 804-1 through 5 are individual apps. This method of rendering improves existing technology by at least transmitting one or more tailored applications as background tasks and in a single overall application view as opposed to a user manually downloading each app they need in an app store.

Figure 9:
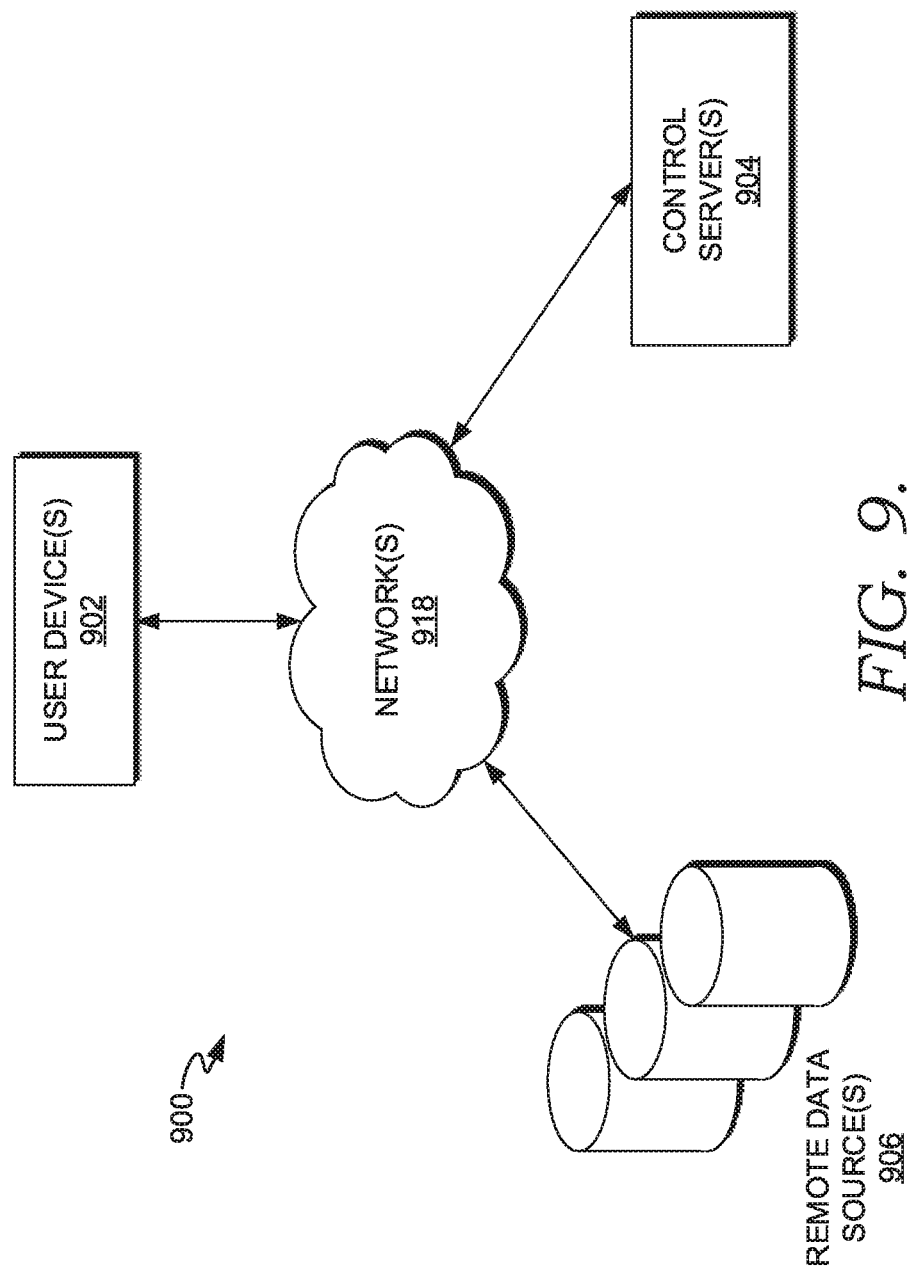
FIG. 9 is a block diagram of a computing environment, according to embodiments.

FIG. 9 is a block diagram of a computing environment 900, according to embodiments. The computing environment 900 includes one or more user devices 902, one or more control servers 904 and one or more remote data sources 906 that are communicatively coupled with each other via one or more networks 918. In some embodiments, the computing environment 900 may be implemented within a cloud computing environment, or use one or more cloud computing services. Consistent with various embodiments, a cloud computing environment includes a network-based, distributed/data processing system that provides one or more cloud computing services. Further, a cloud computing environment can include many computers, hundreds or thousands of them or more, disposed within one or more data centers and configured to share resources over the network 918.

These components can communicate with each other via the network(s) 918, which can be or include any suitable network such as a Personal Area Network (PAN) (e.g., a Bluetooth® (by BLUETOOTH SIG) network), a local area network (LAN), a general wide area network (WAN), and/or a public network (e.g., the internet).

In some computing environments, more or fewer components may be present than illustrated in FIG. 9. In various embodiments, some or each of the components—e.g., the control server(s) 904 and the remote data source(s) 906—represent separate computing devices. In some embodiments, some or each of the components represent particular compute instances of a single computing device (e.g., program modules, computing components within a chassis, a blade server within a blade enclosure, an I/O drawer, a processor chip, etc.)

In some embodiments, the computing environment 900 is the environment in which the processes 500 and/or 600 and/or any other action described herein can be implemented within. The user device(s) 902 include any device associated with a user, such as a mobile phone, desktop computer, sensor devices, etc. In some instances, these devices include a user interface and/or application rendering platform (e.g., the user interfaces in FIGS. 7 and 8). Users can also transmit requests from the one or more user devices 902, such as a request for one or more resources.

The one or more control servers 904 represent the system that acts as an intermediary or coordinator for some or each of the tasks. For example, in some embodiments the one or more control servers 904 includes some or each of the components as described in FIG. 1, such as the framework coordinator 104 and the intelligence platform 114.

The one or more remote data sources 906 represent third party vendors that provide business logic to connect with the control server(s) 904 APIs and/or other remote data sources to help generate user interfaces and/or render applications. For example, in some embodiments, the remote data sources 906 includes the remote data sources described in FIG. 3.

Figure 10:
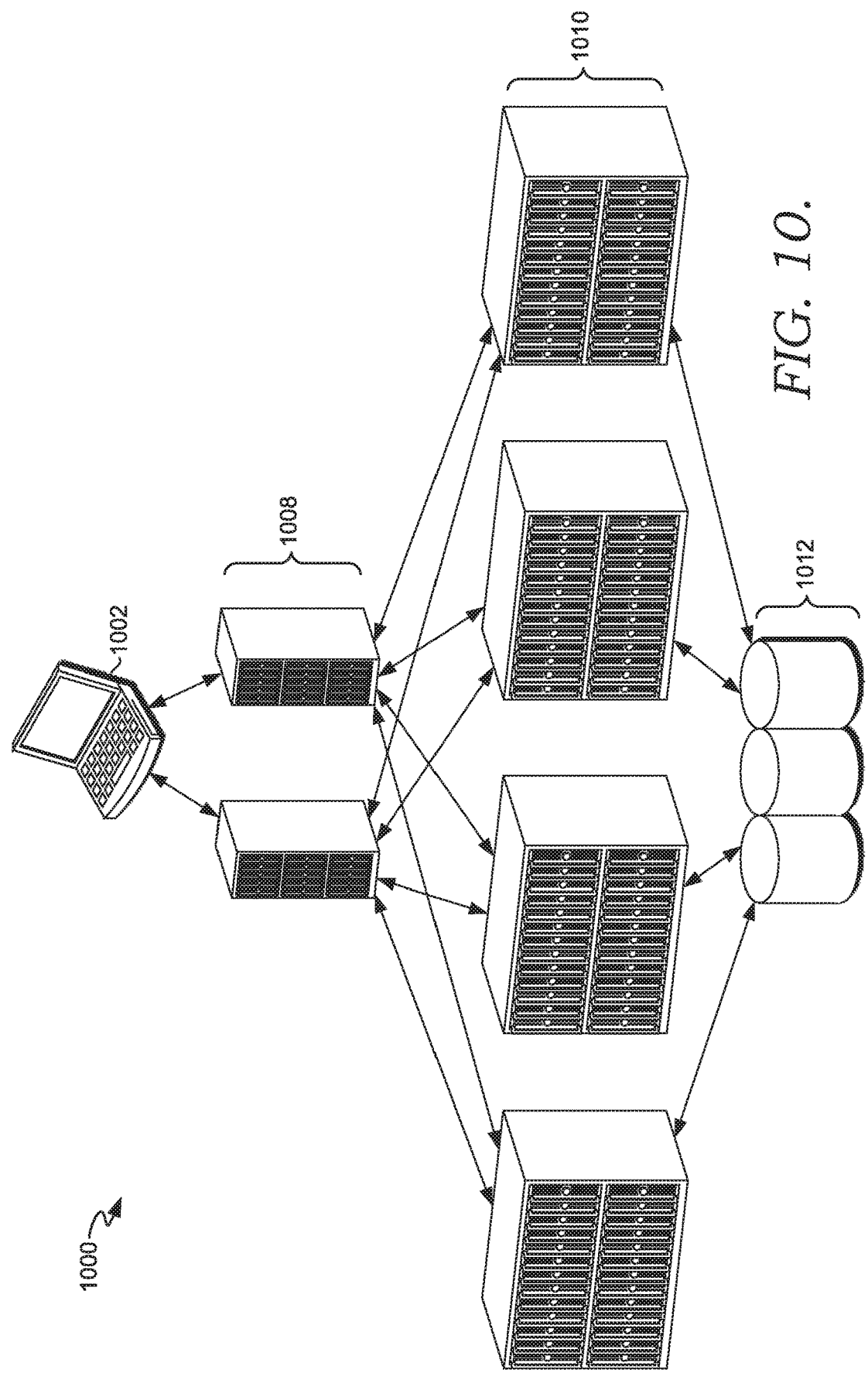
FIG. 10 is a schematic diagram of a computing environment, according to embodiments.

FIG. 10 is a schematic diagram of a computing environment 1000, according to embodiments. In some embodiments, the computing environment 1000 illustrates the physical layer schema of different hosts that implement the processes and actions described herein. In some embodiments, the computing environment 1000 can be included in the computing environment 900 or be the computing environment 900's physical layer implementation.

The computing environment includes the user device 1002, the first tier hosts 1008, the middle tier hosts 1010, and the third tier hosts 1012. The first tier hosts 1002 can be or include any suitable servers, such as web servers (i.e., HTTP servers). Web servers are programs that use Hypertext Transfer Protocol (HTTP) to serve files that form web pages to the user device 1002 in response to requests from HTTP clients (e.g., a browser) stored on the user device 1002. Web servers are typically responsible for front-end web browser-based GUIs at the user device 1002. The web server can pass the request to a web server plug-in, which examines the URL, verifies a list of host name aliases from which it will accept traffic, and chooses a server to handle the request The middle tier hosts 1010 can be or include any suitable servers, such as web application servers (e.g., WEB-SPHERE application servers). Accordingly, a web container within the middle tier hosts 101 can receive the forwarded request from one or more of the first tier hosts 1008 and based on the URL dispatch to the proper application (e.g., a pagelet, plurality of web page views). A web application server is a program in a distributed network that provides business logic for an application program. In some embodiments, the middle tier hosts 1010 include some or all of the system architecture 100 of FIG. 1, such as the framework coordinator 104 and intelligence platform 114. In some embodiments, the middle tier hosts 1010 include third party or vendor-supplied business logic.

The third tier hosts 1012 can or include any suitable servers, data stores, and/or data sources such as databases. In some embodiments, the third tier hosts 1012 include some or each of the remote data sources described herein, such as the remote data stores of FIG. 3. In some embodiments, the third tier hosts include third party or vendor application data repositories.

All three tiers of hosts illustrate how a user requests data and an application and/or user interface is rendered. The presentation of the GUI at the user device 1002 can be implemented via the first tier hosts 1008, which include the business logic rendered by the middle tier hosts 1010 and the data and/or views residing within the third tier hosts 1012. Together, the business logic and the data can form an application (e.g., a pagelet) as utilized by the first tier hosts 1008 for presentation of the GUI within a web page or other application.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 11:
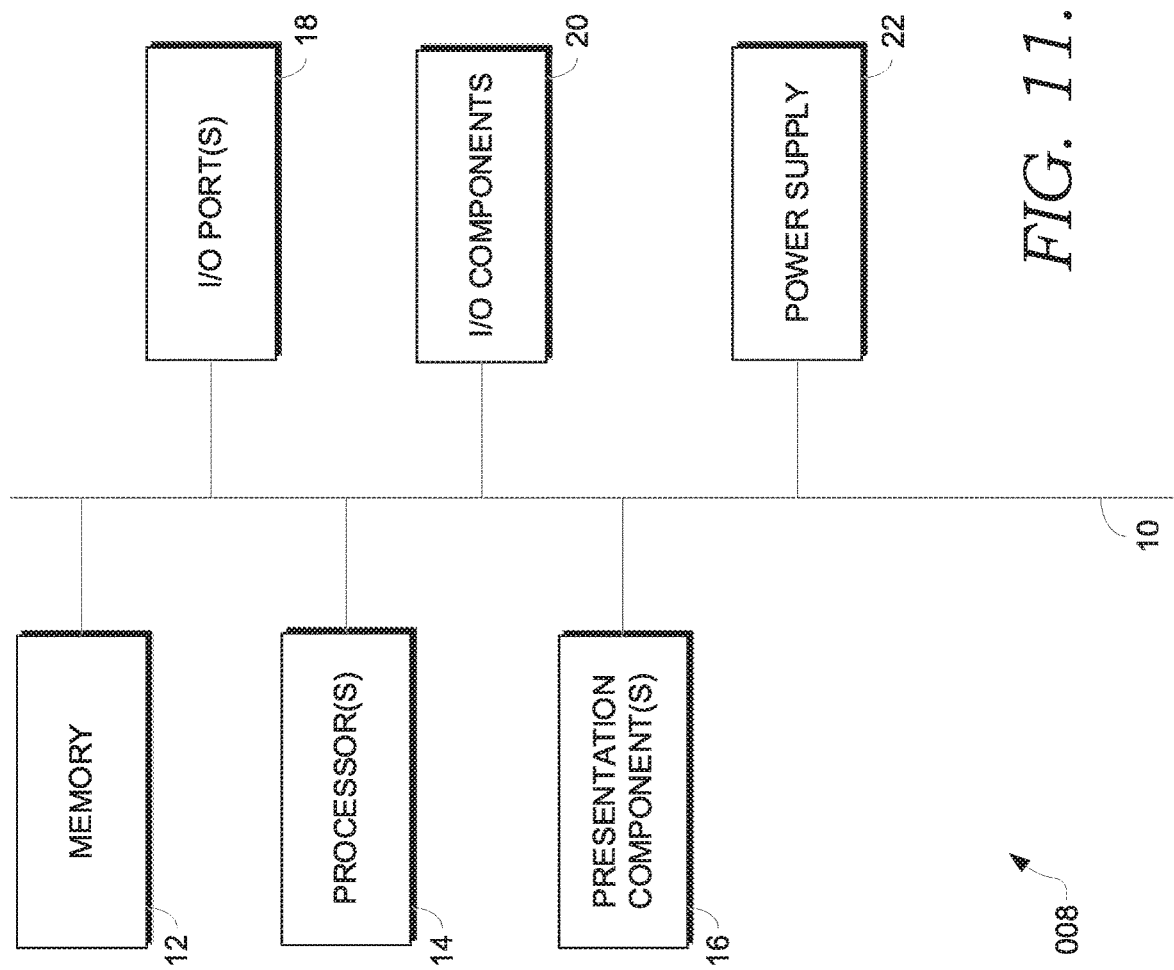
FIG. 11 is a block diagram of a computing device, according to embodiments.

With reference to FIG. 11, computing device 008 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

In some embodiments, the computing device 008 represents the physical embodiments of one or more systems and/or components described above. For example, the computing device 008 can be the user device(s) 902, control server(s) 904, and/or the remote data source(s) 906 of FIG. 9. The computing device 008 can also perform some or each of the blocks in the processes 500 and 600. It is understood that the computing device 008 is not to be construed necessarily as a generic computer that performs generic functions. Rather, the computing device 008 in some embodiments is a particular machine or special-purpose computer. For example, in some embodiments, the computing device 008 is or includes: a multi-user mainframe computer system, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 008 typically includes a variety of computer-readable media. Computer-readable media can be any available media that can be accessed by computing device 008 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 008. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 008 includes one or more processors 14 that read data from various entities such as memory 12 or I/O components 20. Presentation component(s) 16 present data indications to a user or other device. Exemplary presentation components include a display device, speaker, printing component, vibrating component, etc.

I/O ports 18 allow computing device 008 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 008. The computing device 008 may be equipped with depth cameras, such as, stereoscopic camera systems, infrared camera systems, RGB camera systems, and combinations of these for gesture detection and recognition. Additionally, the computing device 008 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "data store" as described herein is any type of repository for storing and/or managing data. For example, a data store can be or include one or more: databases, files (e.g., of unstructured data), corpuses, digital documents, etc.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

The term "computing system" means a single computing device (e.g., a mobile device) and/or multiple computing devices (e.g., multiple cloud computing nodes).

What is claimed is:

1. A computer-implemented method comprising:
   receiving a user request to access one or more resources of a healthcare entity, the user request being associated with a patient;
   automatically querying, in response to the receiving, a plurality of remote data sources for information associated with the patient;
   obtaining the information from the plurality of remote data sources;
   identifying at least one pattern of the obtained information, the at least one pattern being identified using a machine learning model;

automatically generating, based at least in part on the at least one pattern, a user interface and a plurality of different health reminders for the patient to view via a user device;
wherein the generation of the different health reminders includes causing a plurality of applications to be displayed in a containing application of a mobile device based at least in part on the at least one pattern using the machine learning model;
based at least in part on the at least one pattern, causing presentation of at least one health reminder of the plurality of different health reminders;
receiving new health information associated with the patient; and
based on the new health information and the at least one pattern, changing the at least one health reminder of the plurality of different health reminders to indicate a higher priority relative to a time before the new health information was received.

2. The method of claim 1, wherein the plurality of remote data sources includes a second user device of the patient, the second user device is indicative of one or more sensors that track health activity of the patient.

3. The method of claim 1, wherein the changing of the at least one health reminder of the plurality of different health reminders occurs during a same session associated with the user request.

4. The method of claim 1, further comprising generating a plurality of pagelets within a web portal page of the user interface based on the obtained information of the patient.

5. The method of claim 4, further comprising modifying at least one of the plurality of pagelets of the web portal page based on the at least one pattern.

6. The method of claim 1, wherein the obtained information of the patient includes a location of the patient, a medical benefits of the patient, pharmacy benefits of the patient, healthcare clinic information, or wellness classes of the patient.

7. A computer storage media storing computer-useable instructions that, when used by one or more computing devices, cause the one or more computing devices to perform operations comprising:
receiving, from a first computing device, a user request of a patient to access one or more resources of a healthcare provider;
in response to the receiving and without a specific user request, automatically querying a plurality of remote data sources for health information of the patient of the user request;
obtaining the health information from the plurality of remote data sources;
learning, based on using a machine learning model, one or more patterns within the health information;
automatically determining, based at least on the automatically querying and the learning, where a plurality of different health reminders for the patient are to be oriented to view at the first computing device of the patient;
based on the determining and the learning, causing presentation, at the first computing device, of the plurality of different health reminders according to the determined orientation; and
modifying a spatial layout based at least in part on the learning, wherein the spatial layout includes a way that a pagelet is oriented in the user interface, and wherein the way the pagelet is oriented is based at least in part on the learning, and wherein the method further comprises changing at least one of a position or size of the pagelet within the user interface based on new information obtained from at least one remote data source of the plurality of remote data sources.

8. The computer storage media of claim 7, wherein the presentation of the plurality of different health reminders according to the determined orientation indicate a higher priority relative to other information on the user interface.

9. The computer storage media of claim 7, the operations further comprising linking to a third party application that indicates which of the plurality of remote data sources to communicate with.

10. The computer storage media of claim 7, wherein the plurality of remote data sources are associated with a group of sources including: a social media service, a weather service, a health service, a consumer service, and a user device of the patient.

11. The computer storage media of claim 7, wherein the presented health reminders according to the determined orientation are presented at a single web page view that corresponds to a web server that communicates with one or more application servers, the one or more application servers dispatch the single web page view of each of the plurality of remote data sources to the web server such that the single web page view is displayed.

12. A system comprising:
at least one computing device having at least one processor; and
at least one computer readable storage medium having program instructions embodied therewith, the program instructions readable/executable by the at least one processor to cause the system to:
receive a user request of a first user to access a web portal of a healthcare entity;
query, in response to the receiving of the user request of the first user, a first plurality of health services for health information associated with the first user of the user request, the first plurality of health services provide first personal information of the first user;
obtain the first personal information;
learn, based on training a machine learning model, a first set of patterns associated with the first personal information;
generate, based at least on the learned first set of patterns, a first tailored user interface that contains a first set of health reminders for the first user;
receive a second user request of a second user to access the web portal;
query, in response to the receiving of the second user request of the second user, a second plurality of health services for information associated with the second user of the user request, the second plurality of health services provide second personal information of the second user, the second plurality of health services containing at least one service that is different than the first plurality of health services;
learn, based on training the machine learning model, a second set of patterns associated with the second personal information; and
generate, based at least on the learned second set of patterns within the second personal information, a second tailored user interface that includes a second set of health reminders for the second user, wherein the first tailored user interface includes at least one different health reminder content than the second tailored user interface even though the web portal has been requested by the first user and the second user.

13. The system of claim 12, further comprising:
generating one or more prediction estimates associated with the first user based on the first set of patterns; and
wherein the generation of the first tailored user interface is further based on the one or more prediction estimates.

14. The system of claim 12, further comprising causing a modification of the first tailored user interface based on new information received from the first plurality of health services, the modification causing at least a change in content of the first tailored user interface.

15. The system of claim 12, further comprising generating a plurality of pagelets within a web portal page of the first tailored user interface based on the first personal information, the plurality of pagelets corresponding to a plurality of applications that are embedded within a containing application portal associated with the first tailored user interface.

16. The system of claim 15, further comprising modifying at least one of the pagelets of the plurality of pagelets based on one or more prediction estimates associated with the first user, the modifying includes causing a change of position or size of the at least one of the pagelets of the plurality of pagelets.

17. The system of claim 12, wherein the causing the generating of the first tailored user interface includes causing a plurality of applications to be displayed in a containing application of a mobile device.

18. The system of claim 12, wherein the first personal information associated with the first user includes a plurality of attributes that include: a location of the first user, a device fingerprint of the first user, weather data associated with the location of the first user, text generated by the first user, and health data associated with the first user.

* * * * *